(12) United States Patent
Dinsmore

(10) Patent No.: US 9,281,156 B2
(45) Date of Patent: Mar. 8, 2016

(54) VOLUMETRICALLY EFFICIENT MINIATURE X-RAY SYSTEM

(71) Applicant: Thermo Scientific Portable Analytical Instruments Inc., Tewksbury, MA (US)

(72) Inventor: Mark Dinsmore, Sudbury, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 334 days.

(21) Appl. No.: 13/838,565

(22) Filed: Mar. 15, 2013

(65) Prior Publication Data
US 2014/0270083 A1    Sep. 18, 2014

(51) Int. Cl.
| H01J 35/16 | (2006.01) |
| H05G 1/06 | (2006.01) |
| G21G 4/08 | (2006.01) |
| H02M 7/19 | (2006.01) |
| H01J 35/02 | (2006.01) |
| H02M 7/10 | (2006.01) |
| H05G 1/12 | (2006.01) |

(52) U.S. Cl.
CPC .............. *H01J 35/025* (2013.01); *H01J 35/16* (2013.01); *H02M 7/19* (2013.01); *H05G 1/06* (2013.01); *G21G 4/08* (2013.01); *H02M 7/106* (2013.01); *H05G 1/12* (2013.01)

(58) Field of Classification Search
CPC .............. G21G 4/00; G21G 4/04; G21G 4/06; G21G 4/08; H05G 1/00; H05G 1/02; H05G 1/04; H05G 1/08; H05G 1/10; H05G 1/12; H05G 1/14; H01J 35/16; H01J 35/025; H04M 1/00; H04M 1/0061; H04M 3/00; H04M 3/07; H04M 3/22; H04M 3/24; H04M 3/28; H04M 3/285; H04M 7/00; H04M 7/003; H04M 7/19; H04M 7/25
USPC ........... 378/91, 101–104, 109–112, 119, 121, 378/141, 142, 193, 199, 203, 204, 210; 250/493.1, 526; 363/59–61; 307/110
See application file for complete search history.

(56) References Cited

U.S. PATENT DOCUMENTS

| 2,334,519 | A | * | 11/1943 | Vance et al. ................... 307/149 |
| 4,210,813 | A | * | 7/1980 | Romanovsky et al. ....... 378/101 |
| 4,418,421 | A | | 11/1983 | Kitadate et al. |
| 4,646,338 | A | * | 2/1987 | Skillicorn ..................... 378/110 |

(Continued)

FOREIGN PATENT DOCUMENTS

| DE | 976500 | 10/1963 |
| JP | 2008053076 | 3/2008 |

OTHER PUBLICATIONS

Heinzerling, J., "5. Komponenten und Subsysteme der Rontgentechni—Generatoren—Praktische Ausfuhrung," Moderne Bildgebung—Physik, Geratetechnik, bildbearbeitung und—Kommunikation, Strahlenschutz, Qualitatskontrolle, 1998, p. 94, Stuttgart, New York (see attached ISR & WO for relevance).

(Continued)

*Primary Examiner* — Anastasia Midkiff
(74) *Attorney, Agent, or Firm* — Ion C. Abraham

(57) ABSTRACT

A device for producing x-rays includes: a housing that includes a folded high-voltage multiplier coupled to a filament transformer, the transformer coupled to an x-ray tube for producing the x-rays. A method of fabrication and an x-ray source are disclosed.

23 Claims, 5 Drawing Sheets

(56) References Cited

U.S. PATENT DOCUMENTS

| | | | |
|---|---|---|---|
| 4,694,480 A * | 9/1987 | Skillicorn | 378/119 |
| 5,023,768 A * | 6/1991 | Collier | 363/68 |
| 5,057,988 A | 10/1991 | Theroux et al. | |
| 5,077,771 A * | 12/1991 | Skillicorn et al. | 378/102 |
| 5,469,490 A | 11/1995 | Golden et al. | |
| 7,233,645 B2 * | 6/2007 | Feda | 378/102 |
| 7,236,568 B2 | 6/2007 | Dinsmore et al. | |
| 2006/0165220 A1 * | 7/2006 | Takahashi et al. | 378/109 |
| 2008/0130834 A1 | 6/2008 | Bosello | |
| 2009/0041192 A1 | 2/2009 | Sundaram et al. | |
| 2010/0141234 A1 * | 6/2010 | Dinsmore et al. | 323/355 |
| 2010/0302746 A1 * | 12/2010 | Wing | B29C 45/14639 361/760 |

OTHER PUBLICATIONS

International Search Report and Written Opinion in PCT/US2014/022261, mailed Mar. 11, 2015, 22 pages.

* cited by examiner

X-Ray Generator - 5

-- PRIOR ART --

VOLUMETRICALLY EFFICIENT MINIATURE X-RAY SYSTEM

BACKGROUND OF THE INVENTION

1. Field of the Invention

The invention relates to an X-ray system characterized by having a reduced size, and in particular, to techniques for providing and using the X-ray system.

2. Description of the Related Art

There is an interest in compact, low power consumption X-ray devices for a variety of purposes, including portable x-ray analytical instruments. Providing small form X-ray devices has, however, been a challenge.

For example, the size of conventional high voltage power supplies necessary to power X-ray equipment has constrained designers. This has been exacerbated by associated electrical insulation requirements. X-Ray tubes typically used in portable instruments require up to 60,000 Volts accelerating voltage and <1 mA of beam current. The most beneficial arrangement for portable x-ray instrumentation is a grounded anode x-ray source such that a negative high voltage is applied to a cathode end of the x-ray tube, while the output anode end is held at ground potential and presented to the sample. Operation for these types of portable x-ray fluorescence (XRF) instruments requires independent control of the accelerating voltage and the beam current.

Miniature x-ray tubes with a grounded anode design require up to 1 watt of power at one to two volts be applied to the thermionic filament in order sufficiently to emit electrons. The difficulty is that this low voltage, relatively high power signal needs to be isolated from ground potential by the full high voltage being applied to the cathode end of the x-ray tube. Traditional isolation transformers are bulky, generate excessive EMI and are unreliable. As they are situated in the high voltage region of the x-ray source, they contribute significantly to the overall size of the power supply due to electrical insulation requirements. The usual method of isolation is through the use of a transformer. Traditional transformers achieve isolation through independent insulating materials used in their construction. These materials have not historically been matched to the requirements of a miniature high voltage system for use with small x-ray tubes. The non-optimized transformers lead to increased size and wasted space in the design.

Traditional packaging schemes for these miniature power supplies and x-ray tubes use a metal enclosure to contain the insulating material, minimize the emitted electrical noise and reduce the chance of corona which can lead to a degradation of the insulating material over time. Because of the proximity of the metal case to the high voltage components of the power supply, space between the components must be filled with a high dielectric strength substance. Traditional fillers have included transformer oil or polymeric potting materials. These materials usually have a breakdown strength of 400-800 volts/mil requiring a substantial thickness in order to insulate the high voltage (up to 60,000 volts). For example, a 500 volt/mil material would need a minimum of about 0.120" and normally a 100% safety margin is used resulting in a 0.240" requirement for electrical insulation.

What are needed are methods and apparatus for providing x-ray generators that are smaller than previously achieved. Preferably, the techniques result in a versatile, low cost x-ray generator that may be used in instrumentation such as a portable x-ray fluorescence instrument.

SUMMARY OF THE INVENTION

In one embodiment, a device for producing x-rays is provided. The device includes: a housing that includes a folded high-voltage multiplier coupled to a filament transformer, the transformer coupled to an x-ray tube for producing the x-rays.

In another embodiment, a method for fabricating an x-ray source is provided. The method includes: selecting a housing for the source; disposing a folded high-voltage multiplier, a portion of a filament transformer and an x-ray tube within the housing; and disposing a remaining portion of the filament transformer over an exterior of the housing.

In yet another embodiment, an x-ray source is provided. The x-ray source includes: a tubular housing that includes a folded high-voltage multiplier coupled to a filament transformer, the transformer coupled to an x-ray tube for producing the x-rays, wherein the transformer includes an outer coil disposed over an outer surface of the housing, and an inner coil disposed about an inner surface of the housing; and a control circuit electrically coupled to the high-voltage multiplier and the filament transformer.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for providing a small form X-ray generator. Generally, the small form of the x-ray generator results from novel circuit and component design, materials, and packaging. In order to provide some context, aspects of some of the terms used herein as well as a basic review of an x-ray generator are now provided.

As discussed herein, the term "x-ray source" generally refers to equipment as disclosed herein used for generation of x-rays, and is not meant to imply a material for generation of x-rays, nor is it to be confused with prior art embodiments of x-ray generating equipment. Terms such as "small form," and "miniature" as well as "narrow form" and other similar terms used to characterize the x-ray source should be considered as relative (such as with comparison to prior art technology), and taken to be descriptive of the nature of the x-ray source disclosed herein. Such descriptive or relative terminology is not meant to imply a size standard or actual dimensions of the x-ray source. Generally, "x-ray" refers to electromagnetic radiation having a wavelength in the range of about 0.01 nanometers (nm) to about 10 nm.

Figure 1:
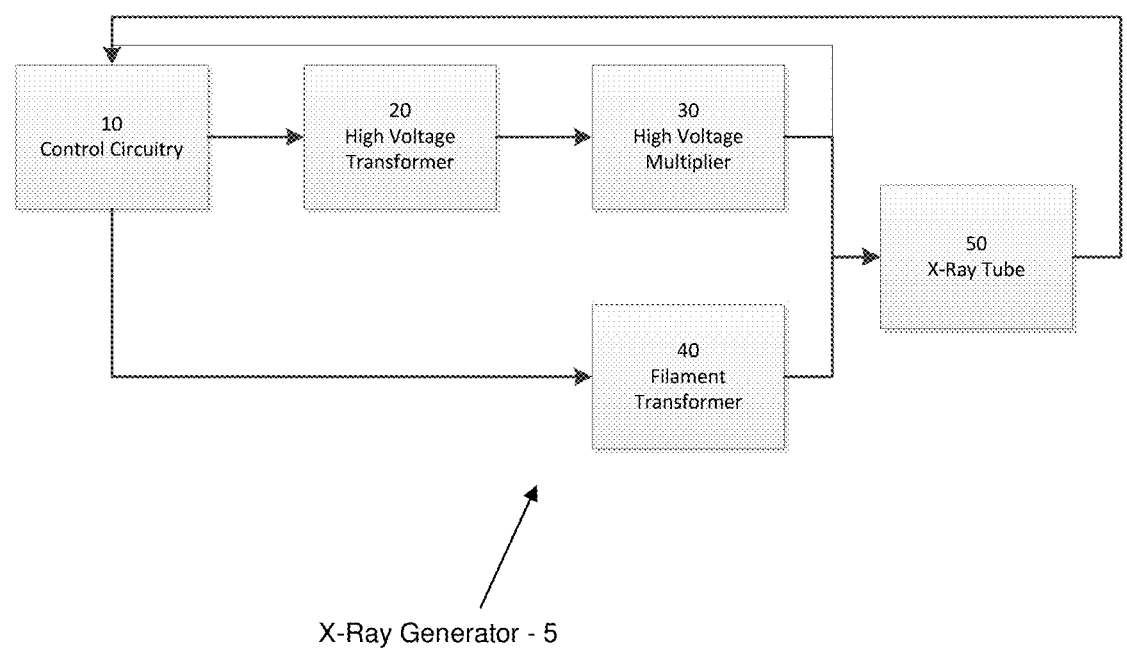
FIG. 1 is a block diagram depicting aspects of a topology for a prior art X-ray generator.

Referring now to FIG. 1, electrical aspects of a prior art x-ray generator 5 are shown. In this example, control circuitry 10 is used to control at least one high voltage transformer 20. The high-voltage transformer 20 outputs an AC voltage to a high voltage multiplier 30. The control circuitry 10 also provides control over at least one filament transformer 40. Together, the high-voltage multiplier 30 and the filament transformer 40 drive an x-ray tube 50. The x-ray tube 50 is used to generate x-rays.

Generally, the control circuit 10 will receive inputs of desired operating voltage and current to maintain the operation of the x-ray generator 5 at desired output levels. In some embodiments, the operating voltage and current desired is defined by user input, such as through a user interface (not shown). For example, the control circuit 10 may receive a 9V direct current (DC) input signal and generates a pulse-width modulated (PWM) 18 volt (V) peak-to-peak signal (alternating current, AC). The 18 V peak-to-peak signal is, in turn, supplied to the high voltage transformer 20. The high voltage transformer 20 takes the 18 VAC signal and transforms it into a 0 to 5,000 volt peak-to-peak DC sine wave, based on the pulse width. The sine wave is fed into the high voltage multiplier 30. The high-voltage multiplier 30, in turn, multiplies the high-voltage to a level suited for driving the x-ray tube 50. For example, output of the high voltage multiplier 30 may be a desired negative high voltage output (for example, up to about 60,000 V). The DC high voltage output is applied to a cathode end of the x-ray tube 50. A potential difference between the cathode end of the x-ray tube 50, at negative high voltage, and the anode end of the x-ray tube 50 (held at ground potential) serves as accelerating potential for electrons in the x-ray tube 50. The high voltage may be sensed by a feedback resistor so that the output can be accurately controlled to the desired operating voltage. Likewise, current may be sensed and used to control the pulse width applied to the filament transformer to control the beam current to the desired level.

Figure 2:
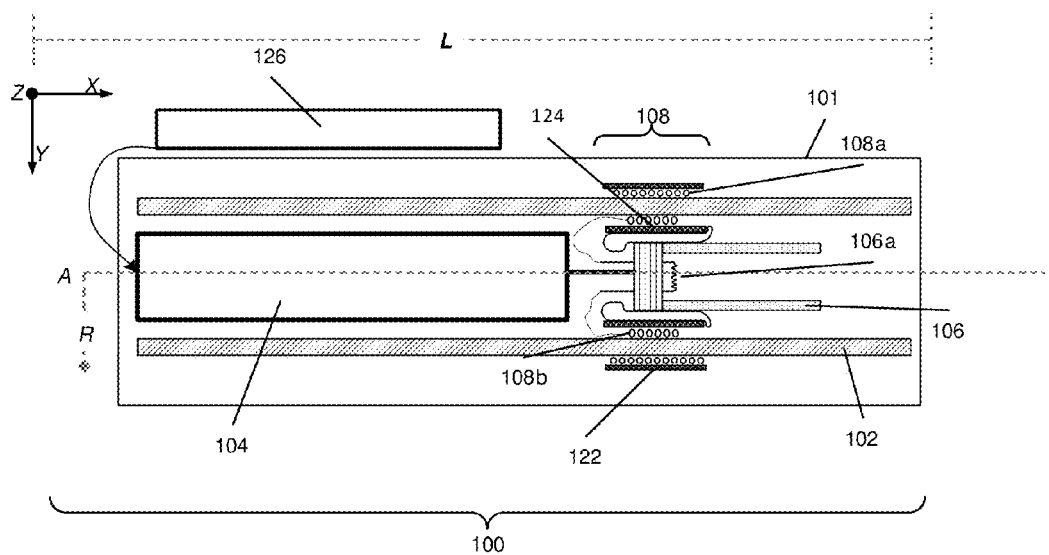
FIG. 2 is a cutaway view of an x-ray source as disclosed herein.

Referring now to FIG. 2, there is shown a cross-sectional view of an embodiment of the x-ray source 100 according to the teachings herein. In this non-limiting example, the x-ray source 100 is a generally cylindrical device. Other forms and geometries of the x-ray source 100 may be provided. Generally, a shape, size, a form, a geometry and other such aspects of the x-ray source 100 may be determined by a designer, manufacturer, a specifier or other similarly interested party. Such aspects may be selected, for example, in order to interface efficiently with a particular x-ray system. However for purposes of the discussion herein, it is considered that the x-ray source 100 is a cylindrical device. In this embodiment, the x-ray source 100 may be characterized as having a central axis, A, a length, L, and a radius, R.

In this embodiment, the x-ray source 100 is generally surrounded by an insulating structure 102, in this case a tubular insulating structure. In this example, the tubular insulating structure 102 is formed of an electrically insulating material, such as cross-linked polyethylene (PEX). Disposed within the tubular insulating structure 102 is x-ray tube 106 (which includes an x-ray tube filament 106A) and a high-voltage section 104. Disposed about the tubular insulating structure 102 is a filament transformer 108. Disposed about the insulating structure 102 is a metallic housing 101. Disposed on an exterior of the metallic housing 101 is a control circuit 126. The control circuit 126 is coupled to the high-voltage section 104 and the filament transformer 108. The filament transformer 108 includes an outer set of windings as a primary coil 108A. The primary coil 108A is generally wrapped around the tubular housing 102. The filament transformer 108 also includes an inner set of windings as a secondary coil 108B. The secondary coil 108B is generally wrapped around a base of a body for the x-ray tube 106. The x-ray tube 106 has a dimension such that, with secondary coil 108B wrapped thereabout, it will fit snugly within an inner diameter of the tubular housing 102. Accordingly, the base of the x-ray tube 106 (and therefore the secondary coil 108B) is aligned with the primary coil 108A to provide for an effective transformer. The use of the primary high voltage insulating structure 102 as the insulating material for the filament transformer 108 eliminates a need for separate insulation for the filament transformer 108 and allows the entire assembly to remain axially symmetric and compact.

An inner course 124 of magnetic material and an outer course 122 of magnetic material is provided with the coils 108A, 108B. In some embodiments, the magnetic material includes a flexible magnetic material. Examples include various forms of magnetic foils, composite materials, ferrite cores, powdered metal cores, and other materials exhibiting similar properties. Suitable materials are commercially available from METGLAS of Conway, S.C. In some embodiments, magnetic materials included in the filament transformer 108 are custom molded. The magnetic material concentrates the magnetic field in the windings, making the filament transformer 108 more efficient and preventing the interior and exterior metallic components from acting like a shorted turn and reducing the electrical efficiency.

The control circuit 126 may be affixed to an interior or exterior of the metallic housing 101 in any manner deemed appropriate. For example, the control circuit 126 may be contained within a container, such as a nonconductive housing, and attached to the metallic housing 101. In some embodiments, a container for the control circuit 126 may include appropriate shielding, such as shielding for electromagnetic interference (EMI) and/or radiation. Attaching the control circuit 126 to the metallic housing 101 may be performed in any manner deemed appropriate. For example, the control circuit 126 (and any suitable mounting apparatus, such as a container or the like) may be glued, clipped, crimped, screwed, bonded, embedded or otherwise associated with the metallic housing 101. The control circuit 126 may be at least partially disposed on the exterior of the metallic housing 101. That is, at least a portion of the control circuit 126 may also be disposed within the metallic housing 101. Accordingly, the metallic housing 101 may include at least one penetration there through to provide for at least one of electrical connection and physical affixation of the control circuit 126.

Generally, the control circuit 126, the high-voltage section 104 the x-ray tube 106 and the filament transformer 108 are electrically connected with appropriate electrical connections. The electrical connections may include wires, vias, clips, mounts, and other types of connections and connecting components. Void space within the x-ray source 100 must be displaced by insulating material, for example, potting material, sulfur hexafluoride gas, or dielectric fluid. Generally, the potting material chosen provides adequate electrical isolation along the axis, A, as well as enhancement of structural integrity of the physical arrangement of the various components within the x-ray source 100 if potting is used.

Generally, the high-voltage section includes a high-voltage multiplier 104. In this example, the high-voltage multiplier 104 is a "Cockcroft Walton" type of high-voltage multiplier. Generally, a "Cockcroft Walton" voltage multiplier converts AC or pulsing DC electrical power from a low voltage level to a higher DC voltage level. This includes a ladder network of capacitors and diodes to generate high voltages. Unlike transformers, a voltage multiplier of this design eliminates a need for the bulk of accompanying insulation. Using only capacitors and diodes, the high-voltage multiplier may be configured to step-up relatively low voltages to extremely high values, while at the same time being far lighter and cheaper than designs that make use of transformers. Advantageously, the voltage across each stage of the cascade is equal to only twice the peak input voltage in a half wave rectifier. Further, this has the advantage of enabling use of relatively low cost components and being easy to insulate.

As a matter of convention, it may be considered that a base of the x-ray source 100 is a "near" side, while an open end of the x-ray source 100 may be referred to as a "far side."

Figure 3:
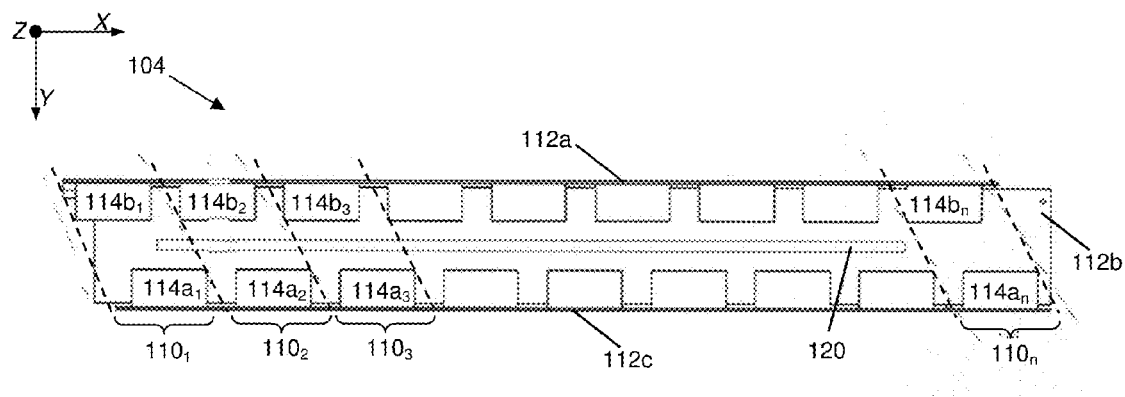
FIGS. 3-5 illustrate views of a high voltage multiplier according to the teachings herein.
Figure 4:
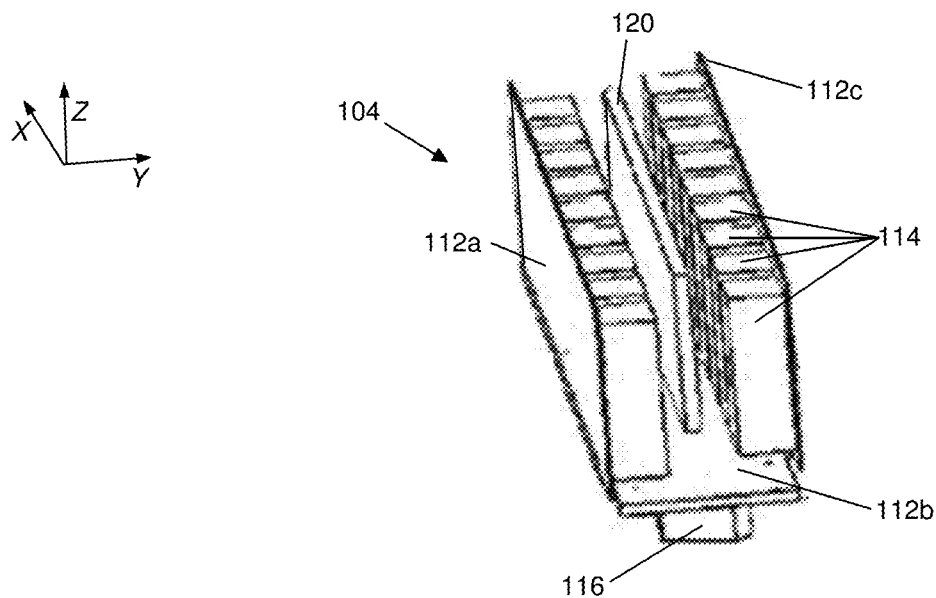
Figure 5:
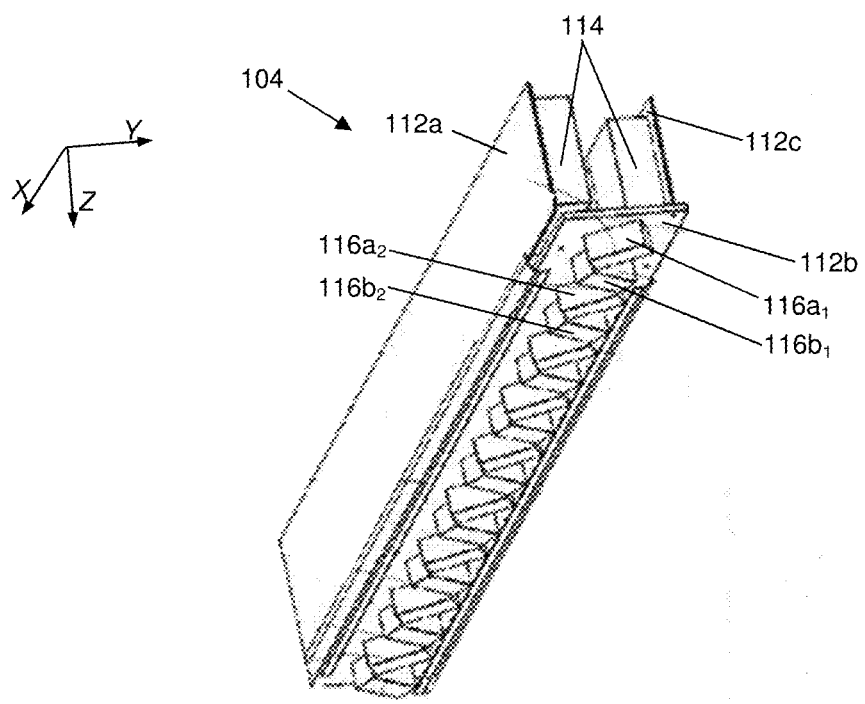

Referring now to FIGS. 3-5, aspects of the high voltage multiplier 104 are shown. In FIG. 3, a cross-sectional view of the high-voltage multiplier 104 is depicted. In this example, the high-voltage multiplier 104 includes a plurality of capacitors 114. Also shown in FIGS. 4-5, the high-voltage multiplier 104 includes a plurality of diodes 116. The plurality of capacitors 114 and the plurality of diodes 116 are disposed on a circuit board 112. Collectively, the plurality of capacitors 114 are configured with the plurality of diodes 116 to provide for the high-voltage multiplier 104. That is, the plurality of capacitors 114 are electrically coupled with the plurality of diodes 116 to provide for the high-voltage multiplier 104, which is in this example, a Cockcroft Walton type of voltage multiplier.

In order to make efficient use of the limited volume within the tubular insulating structure 102, the electrical components (i.e., the capacitors 114 and the diodes 116) are disposed onto a "folded" circuit board 112. That is, the circuit board may actually include a plurality of circuit boards (e.g., 112A-112C) that are oriented with respect to each other such that one circuit board may be viewed as being "folded" together. In this example, an intermediate circuit board 112B is orthogonally oriented to opposing circuit boards 112A and 112C. Thus, opposing circuit boards 112A and 112C exhibit the "folded" appearance. A number of other geometries for the circuit boards 112 may be practiced. However, it is considered that the term "folded" generally applies to any geometry where the high-voltage multiplier 104 is disposed on a plurality of circuit boards or flexible circuitry, or a combination thereof, and such circuit boards or circuitry is arranged, folded, layered, stacked or otherwise configured to provide for efficient use of volume within a respective housing (in this embodiment, the tubular insulating structure 102). In some embodiments, the high-voltage multiplier 104 may be provided in a different form. That is, is not necessary that the high-voltage multiplier 104 be folded. For example, in some embodiments, the high-voltage multiplier 104 may be provided on a conventional printed circuit board.

In some embodiments, the circuit board 112 is provided as a flexible circuit board. In these embodiments, it is possible to "fold" the circuit board 112 with respect to conventional interpretations of the term "fold." In some other embodiments, such as the one depicted in FIGS. 3-5, the high-voltage multiplier 104 includes components disposed on a plurality of rigid printed circuit boards 112A-112C.

Turning now to FIG. 3, a cross-section of the high-voltage section 104 (i.e., the high-voltage multiplier) is shown. In this example, the high-voltage multiplier 104 includes a plurality of stages 110. A first stage 110-1 includes a pair of capacitors 114A-1, 114B-1 and a respective pair of high-voltage diodes 116A-1, 116B-1. As is known in the art of Cockcroft Walton types of voltage multipliers, each of the respective stages 110 mimics components and construction of the first stage, and generally provides for a stepping of the input voltage.

Included within the high-voltage multiplier 104 is at least one feedback resistor 120. In this example, the feedback resistor 120 is a precision high-voltage resistor. The feedback resistor size is chosen to match the length of the high-voltage multiplier 104 to reduce the voltage gradient between the high-voltage multiplier 104 and the resistor 120, thus reducing leakage currents and enhancing the accuracy of the high voltage measurement.

Generally, the metallic housing 101 made of metal to provide for structural strength as well as shielding from electromagnetic interference (EMI) as well as to provide radiation shielding. Other metallic and/or structural materials may be used as deemed appropriate. The metallic housing 101 may be adapted for fitting within another component such as an instrument making use of the x-ray source 100.

Figure 6:
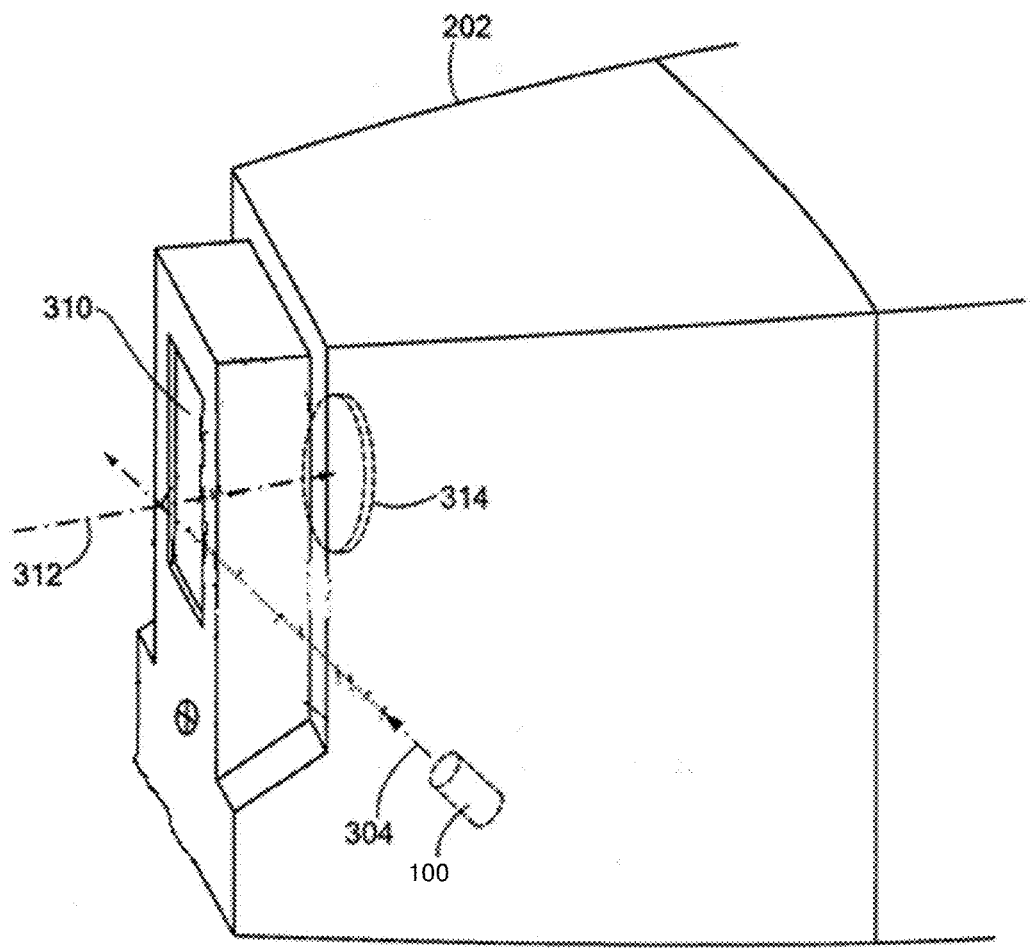
FIG. 6 is a cutaway view of an instrument making use of the x-ray source disclosed herein.

Referring now to FIG. 6, there is shown a cutaway view of a portion of an exemplary embodiment of an instrument for making use of the x-ray source 100. In this example, the instrument is a portable x-ray fluorescence device 202 (referred to herein generally as a "XRF instrument"). In this embodiment, the device 202 includes the x-ray source 100 disposed within a housing thereof. At least one detector 314 is also disposed within the housing. In operation, the x-ray source 100 produces an x-ray beam 304. The x-ray beam 304 is directed through a window 310 and irradiates a sample (not shown). When irradiated with x-rays, the sample will fluoresce. Fluorescence from the sample will produce a sample beam 312. A portion of the sample beam 312 will be detected by detector 314. Detector 314, which is coupled to a detection circuit (not shown) will provide for analysis of the sample.

The window 310 may be covered by a thin sheet of x-ray transparent material, such as a polyimide film, to prevent dirt or other contaminants from entering the snout 202 through the window 310. A suitable polyimide film is available under the tradename KAPTON from E.I. duPont deNemours and Company of Wilmington Delaware.

Generally, the x-ray source 100 may be used for any device that requires or makes use of relatively low power x-ray tubes. For example the x-ray source 100 may be used with smaller x-ray diffraction or x-ray imaging systems.

Advantageously, by making use of the smaller form x-ray source 100, the device 202 may also be provided in a smaller form. Additionally, in some embodiments, by using the smaller form x-ray source 100, manufacturers may dispense with use of radioactive sources. By offering a device that does not include radioactive sources, manufacturers are able to more freely and cheaply offer and distribute their respective devices.

Having thus described some embodiments of the x-ray source 100, some additional aspects are now discussed.

Generally, the circuit board 112 may employ a variety of different technologies. That is, at least one of all flexible printed circuit boards (PCB) may be used, all rigid printed circuit boards may be used (such as those having traditional layouts), a sectioned printed circuit board may be used (such as one outfitted with flexible hinges, ribbon cables, or the like), a rigidized circuit board may be used (such as one with flexible sections), circuit boards including rigid sections with pin connectors and or wires may be used as well. Various other physical or mechanical modifications of the circuit board 112 may be incorporated. For example, slotting (such as underneath at least one of the capacitors 114) may be used. Slotting may provide for, among other things greater flexure and better cleaning access.

In some embodiments, a flexible printed circuit board such as a KAPTON FLEX PCB (available from DuPont of Wilmington Del.) may be used. Generally, such embodiments include polyimide film that exhibits excellent dielectric strength, thermal stability, chemical resistance, flexibility, and dimensional stability.

Filling of the void spaces within the x-ray source 100 may be accomplished with a variety of different materials. Generally, the term "potting" is used with reference to filling of the void spaces within the x-ray source 100. In some embodiments, a high-voltage encapsulant is used. In some embodiments, a polybutadiene formulation along with a fluid dielectric is used. Butadiene rubber (synthetic rubber) may be used.

Butadiene rubber generally consists of polybutadiene, an elastomer (elastic polymer) built up by chemically linking multiple molecules of butadiene to form giant molecules, or polymers. The polymer is noted for its high resistance to abrasion, low heat buildup, and resistance to cracking. Other compounds may include silicone-based elastomer formulations. Some suitable and exemplary formulations are available from Dow Corning of Midland Mich., Insulcast and Masterbond. In some embodiments, a hard epoxy may be used. In another embodiment, a fluid dielectric such as transformer oil or a fluorinated hydrocarbon may be used. Perfluorinated fluids may be used. Use of a fluid may be advantageous in some embodiments, such as embodiments where access to the electronics contained within the x-ray source 100 may be desired. Accordingly, in some embodiments, such as where a fluid insulating material is used, it is possible to remove components such as the high-voltage multiplier 104 and the filament transformer 108. Removal of components may be advantageous or desired for maintenance and other similar purposes. A suitable high voltage insulating gas such as sulfur hexafluoride can be used, with the same advantages of the liquid dielectric materials. Shielding materials may be added to the potting material to help shield stray X radiation from penetrating the tube. For example, non-conducting oxides of at least one of lead, tungsten, and bismuth may be added to the polymeric potting material to help reduce stray radiation coming from the x-ray source 100.

The tubular insulating structure 102 may be fabricated from a variety of materials. Suitable materials for the tubular insulating structure 102 generally include materials that exhibit high dielectric strength (such as on the order of 2000 V/mil to 7000 V/mil. Ultrahigh molecular weight or crosslinked polyethylene (PEX) material (exhibiting a dielectric of about 2300 V/mil) may be used. Other suitable materials include KAPTON and MYLAR, as well as fused silica and quartz.

Although the housing has been disclosed as a metallic housing 101 that includes a tubular insulating structure 102, which may be considered to be generally circular, this is not a requirement. Extrusions of other cross-sectional geometries may be used (e.g., hexagonal, rectangular, etc, . . . ).

An exemplary embodiment of the x-ray tube 106 is provided in U.S. Pat. No. 7,657,003, issued Feb. 2, 2010 to William Adams, and entitled "x-ray tube with enhanced small spot cathode and methods for manufacture thereof." This patent discloses an x-ray source that produces a well-defined electron beam, without an undesirable halo. The x-ray source includes a housing, a cathode disposed within the housing, an anode spaced apart from the cathode for accelerating electrons emitted from the cathode and an x-ray emitter target disposed within the housing and spaced apart from the cathode for impact by the accelerated electrons. The cathode includes a passivation layer over only a portion of the area of the cathode, leaving an emission portion of the cathode that is not passivated. The passivation layer reduces or prevents emissions from the passivated portion of the cathode, thereby preventing a halo, which would otherwise be produced by lower-level emissions from the portion of the cathode that surrounds the emission portion of the cathode. This patent is incorporated by reference herein in its entirety, with the exception that if any subject matter therein is in conflict with the present disclosure, then the subject matter of the present disclosure shall prevail.

Figure 7:
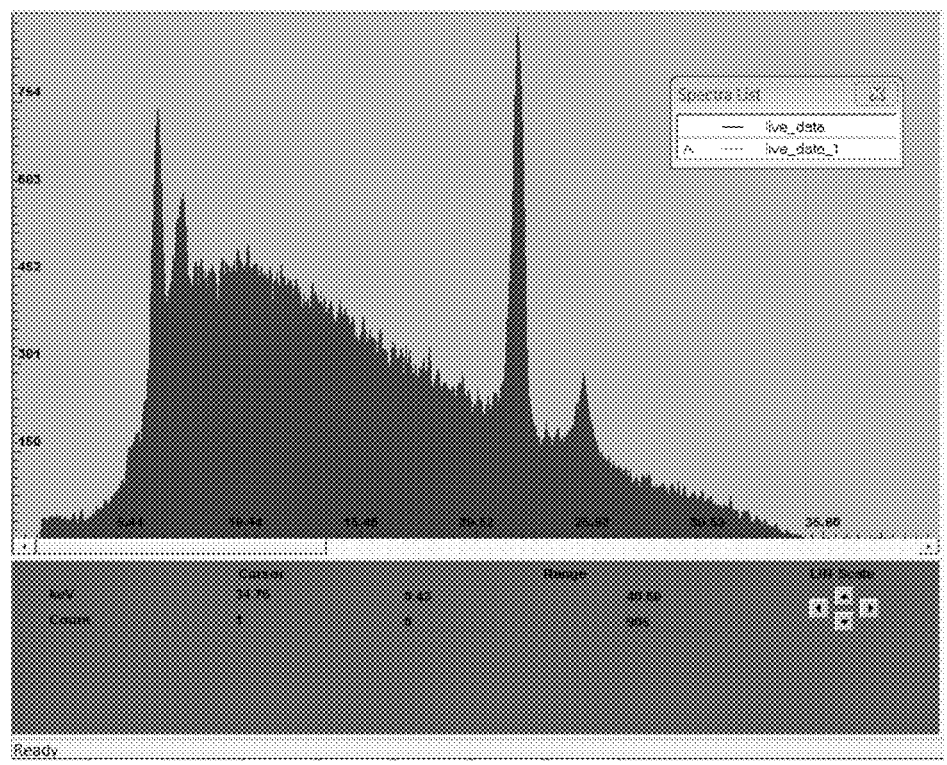
FIGS. 7-8 are graphs that depict performance of the x-ray source disclosed herein.
Figure 8:
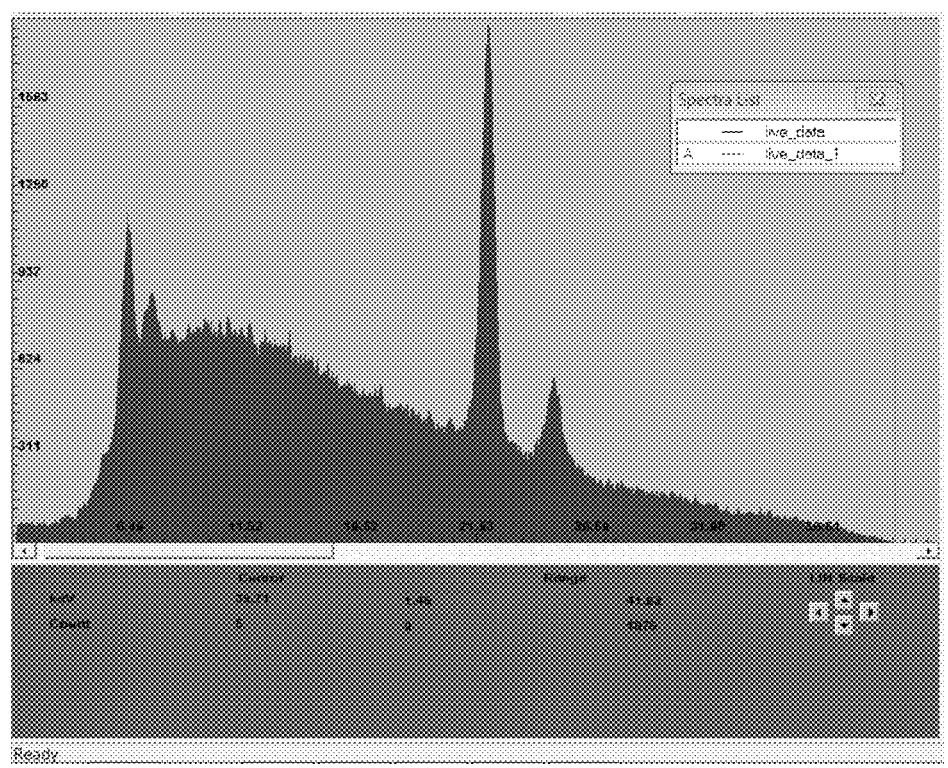

As a result, the teachings herein provide for an x-ray source of a drastically reduced size. While the x-ray source has a substantially reduced volume, it also has a substantially reduced cost, an improved assembly process, a reduced weight and a reasonable output (e.g., 0-60 kV, 0-1 mA, 10 Watt Max output). FIGS. 7-8 are graphs depicting performance of x-ray sources that correlate to embodiments provided in Table 1.

It will be appreciated that any embodiment of the present invention may have features additional to those cited. Sometimes the term "at least" is used for emphasis in reference to a feature. However, it will be understood that even when "at least" is not used, additional numbers or type of the referenced feature may still be present. All references cited in the present application are fully incorporated herein by reference. However, where anything in any incorporated reference contradicts anything stated in the present application, the present application prevails. The order of any sequence of events in any method recited in the present application, is not limited to the order recited. Instead, the events may occur in any order, including simultaneously, which is logically possible.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for producing x-rays, the device comprising: a flexible printed circuit board including a folded high-voltage multiplier coupled to a filament transformer, the transformer coupled to an x-ray tube for producing the x-rays.

2. The device as in claim 1, wherein the device is disposed within a metallic housing that comprises a tubular insulating structure disposed therein.

3. The device as in claim 2, wherein the filament transformer comprises an outer coil disposed over an outer surface of the tubular insulating structure, and an inner coil disposed about an inner surface of the tubular insulating structure.

4. The device as in claim 3, wherein the filament transformer comprises at least one layer of magnetic material.

5. The device as in claim 4, wherein the magnetic material comprises at least one of a flexible and a rigid magnetic material.

6. The device as in claim 1, further comprising a control circuit coupled to the high-voltage multiplier, the filament transformer, and the x-ray tube.

7. The device as in claim 6, wherein the control circuit is contained within a container.

8. The device as in claim 7, wherein the container comprises shielding for at least one of electromagnetic interference (EMI), and radiation.

9. The device as in claim 1, wherein the high-voltage multiplier comprises a plurality of capacitors and a plurality of diodes arranged in stages.

10. The device as in claim 1, further comprising at least one insulating material disposed within void space of the housing.

11. The device as in claim 10, wherein the insulating material comprises at least one of a potting compound, rubber, synthetic rubber, polymeric material, elastomeric material, oil, per-fluorinated fluid, and a gaseous insulating material.

12. A method for fabricating an x-ray source, the method comprising:
    selecting a housing for the source;
    disposing a flexible printed circuit board including a folded high-voltage multiplier, a portion of a filament transformer and an x-ray tube within the housing; and
    disposing a remaining portion of the filament transformer over an exterior of the housing.

13. The method as in claim 12, wherein the selecting further comprises selecting a metallic housing and selecting an insulating structure configured to fit within the housing.

14. The method as in claim 13, wherein the tubular insulating structure is chosen from a material with a high dielectric strength and high voltage endurance.

15. The method as in claim 12, further comprising electrically coupling the high-voltage multiplier, the filament transformer, and a control circuit.

16. The method as in claim 12, further comprising electrically coupling the high voltage multiplier and the filament transformer to the x-ray tube.

17. The method as in claim 12, further comprising filling void spaces of the housing with an insulating material.

18. An x-ray source comprising:
    a metallic housing comprising a tubular insulating structure disposed therein, the tubular insulating structure comprising a flexible printed circuit board including a folded high-voltage multiplier coupled to a filament transformer, the transformer coupled to an x-ray tube for producing the x-rays, wherein the transformer comprises an outer coil disposed over an outer surface of the tubular insulating structure, and an inner coil disposed about an inner surface of the tubular insulating structure; and
    a control circuit electrically coupled to the high-voltage multiplier and the filament transformer to independently control high voltage and beam current of the x-ray tube.

19. The x-ray source as in claim 18 configured for installation into an instrument.

20. The x-ray source as in claim 18, configured to provide up to 10 W output with 0-60 kV and 0-1 mA output.

21. A device for producing x-rays, the device comprising:
    an elongated insulating structure;
    an x-ray tube disposed inside the insulating structure toward a front end thereof, the tube having a filament;
    a high-voltage power supply disposed inside the housing behind the x-ray tube, the high-voltage power supply comprising a flexible printed circuit board including at least one folded section;
    a transformer comprising an outer coil disposed over an outer surface of the insulating structure and an inner coil disposed about an inner surface of the insulating structure.

22. A device according to claim 21, wherein the high-voltage power supply is a Cockcroft Walton power supply comprising a feedback resistor disposed lengthwise along the at least one folded section.

23. A device according to claim 21 wherein at least one of the x-ray tube and the power supply are removable from the insulating structure.

* * * * *